United States Patent [19]

Sim et al.

[11] Patent Number: 5,189,568

[45] Date of Patent: Feb. 23, 1993

[54] METHOD AND APPARATUS FOR GENERATING FRAME CONTROL SIGNALS IN A MULTIHEAD VIDEOTAPE RECORDER USING MULTIPLE VIDEO SIGNAL TRACKS FOR EACH VIDEO FRAME

[75] Inventors: Myeong-bo Sim; Jeong-il Park, both of Kyunggi-do; Cheol-weon Lee, Seoul, all of Rep. of Korea

[73] Assignee: Samsung Electronics Co., Ltd., Kyunggi-do, Rep. of Korea

[21] Appl. No.: 676,003

[22] Filed: Mar. 27, 1991

[30] Foreign Application Priority Data

Jun. 29, 1990 [KR] Rep. of Korea ..................... 90-9770
Mar. 11, 1991 [KR] Rep. of Korea ..................... 91-3874

[51] Int. Cl.$^5$ .......................... G11B 15/52; G11B 5/02
[52] U.S. Cl. ..................................... 360/73.13; 360/27
[58] Field of Search ................. 360/14.2, 25, 27, 10.1, 360/10.2, 35.1, 36.1, 73.04, 73.11, 73.12, 73.13

[56] References Cited

U.S. PATENT DOCUMENTS

| | | | |
|---|---|---|---|
| 4,366,510 | 12/1982 | Watanabe et al. | 360/27 X |
| 4,570,192 | 2/1986 | Hori | 360/14.2 |
| 4,605,976 | 8/1986 | Ito et al. | 360/73.11 X |
| 4,691,250 | 9/1987 | Ookawa | 360/14.2 X |

Primary Examiner—Andrew L. Sniezek
Attorney, Agent, or Firm—Rothwell, Figg, Ernst & Kurz

[57] ABSTRACT

A method for recording a frame control signal serving as a reference signal of a video frame during recording, and for generating a frame control signal in a VTR (video tape recorder) from a control track based on a control signal during reproduction, wherein the video signal is recorded on and reproduced from multiple video tracks using multiple heads.

The method for generating the frame control signal comprises the steps of using a microprocessor to determine whether a VTR is in the record or playback mode, counting the number of rising edges of the control signal, recording the control signal at 60% duty cycle or $\alpha$ % duty cycle based on a derived value "n", generating a frame control signal and controlling the phase of a capstan motor.

As a result, the frame control signal serving as a reference signal of the video signal is commonly held on the control track of the video tape with other control signals, so that the controlling of the phase of the motor and of the video signal is enhanced by microprocessor programming.

7 Claims, 5 Drawing Sheets

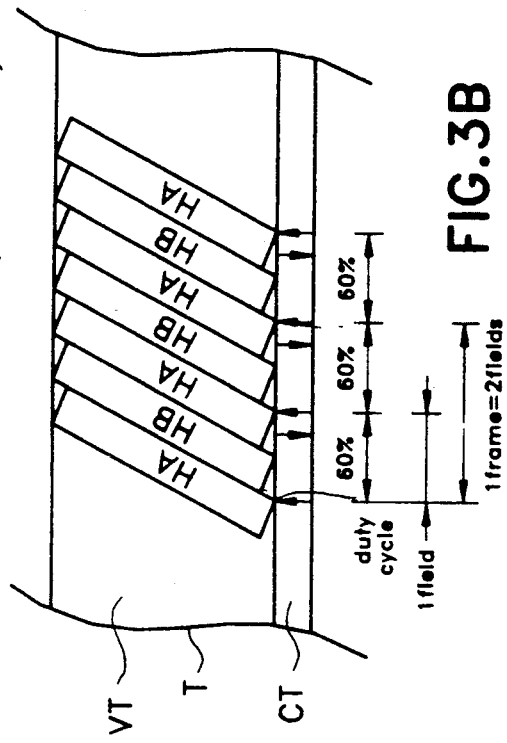
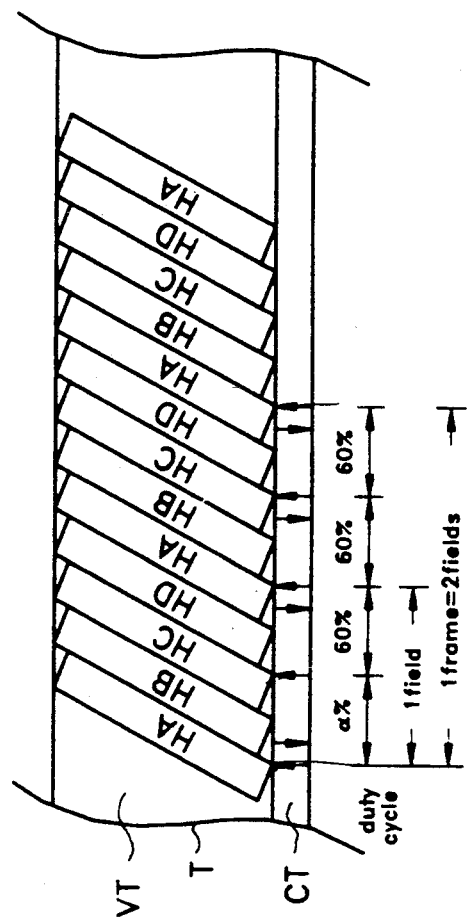
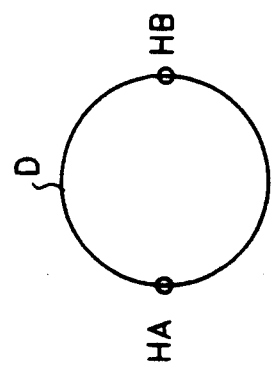
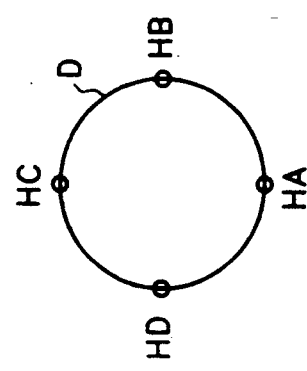

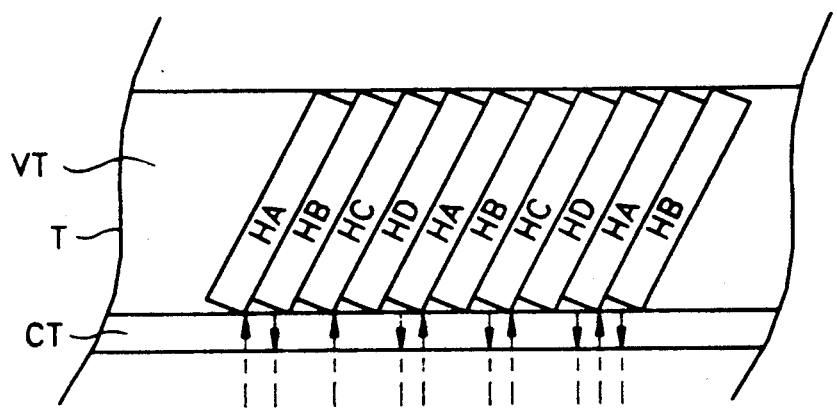
FIG.4A
FIG.4B
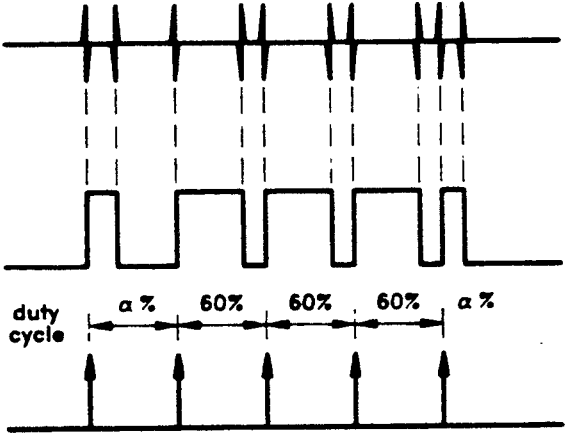
FIG.4C
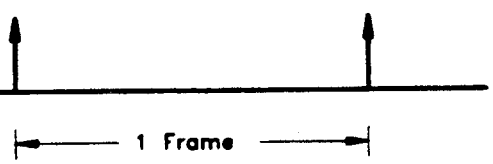
FIG.4D

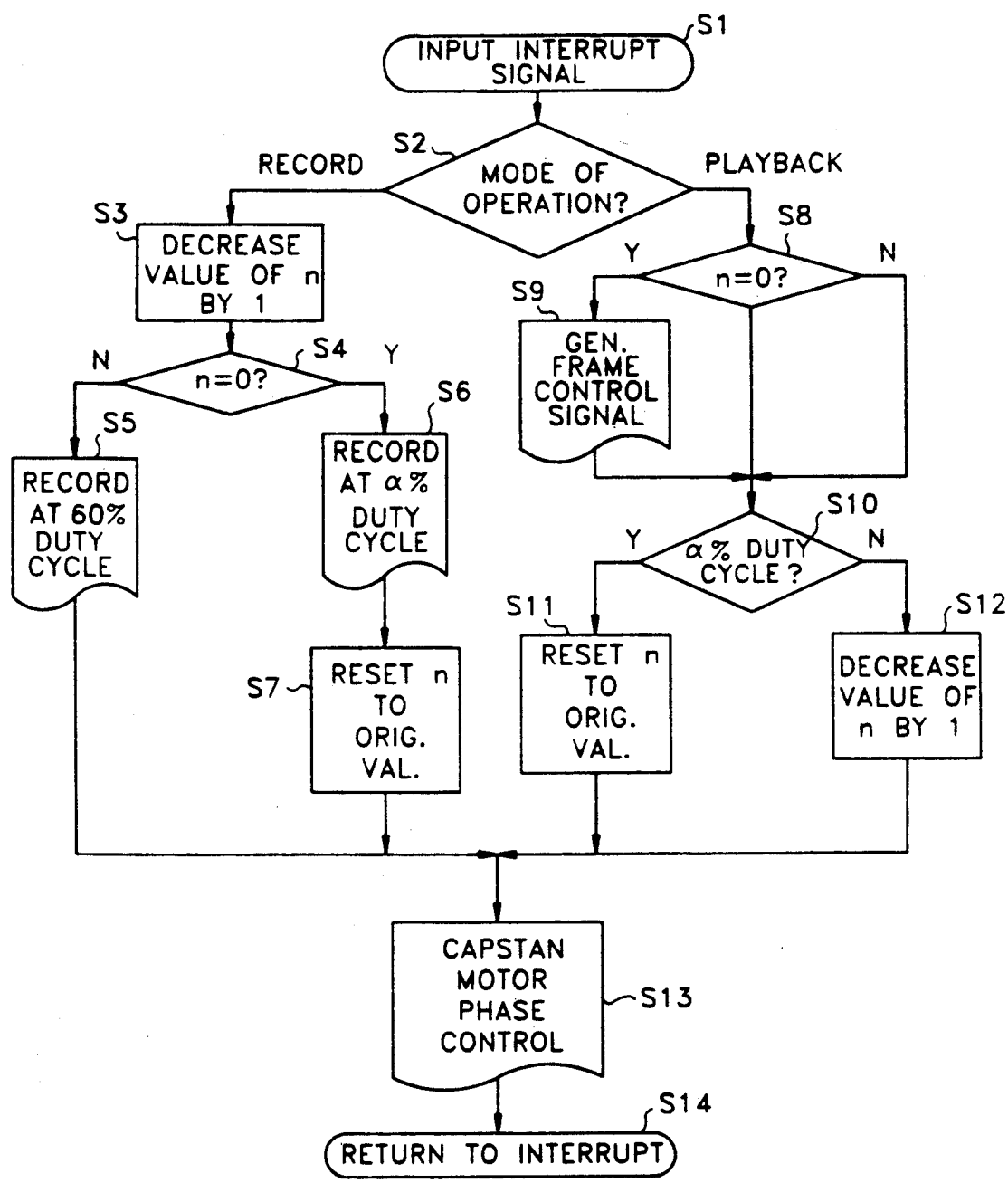

METHOD AND APPARATUS FOR GENERATING FRAME CONTROL SIGNALS IN A MULTIHEAD VIDEOTAPE RECORDER USING MULTIPLE VIDEO SIGNAL TRACKS FOR EACH VIDEO FRAME

FIELD OF THE INVENTION

The present invention relates to a method for generating frame information in a videotape recorder (VTR), and particularly to a method for recording a frame control signal, serving as a video reference signal, onto a control track of a magnetic video tape during recording, and for generating a frame control signal from the control track during playback when the video signal is recorded on and reproduced from multiple video tracks of a video tape in a multihead VTR.

BACKGROUND OF THE INVENTION

The hardware construction of a VTR of the present invention for recording and reproducing a frame control signal is schematically illustrated in FIG. 1, wherein a microprocessor 1 is used for controlling the speed and phase of a capstan motor 6 and a drum motor 5. Referring to FIG. 1, a microprocessor 1 receives a synchronizing signal Sync containing a vertical synchronizing signal Vsync and a horizontal synchronizing signal Hsync at an input terminal EXT/INT and, using the Vsync signal as a reference, supplies a control signal at a first input/output port I/O PORT 1 to a control head 2 via a recording amplifier 3 during recording, and receives at the first input/output port I/O PORT 1a control signal reproduced from the control head 2 via a reproducing amplifier 4 during playback. On the other hand, the microprocessor 1 generates a frame control signal at a second input/output port I/O PORT 2, and outputs a high signal when the frame control signal is generated. The output signal from the second input/output port I/O PORT 2 is logically multiplied in an AND gate 5 with the reproduced control signal supplied from the reproducing amplifier 4, and then the logically multiplied output is supplied to a video signal processor not shown in the drawing.

In a conventional home video tape recorder, as shown in FIGS. 2A and 2B, two fields constitute one frame on the video track VT of a video tape T, and, since one control signal is generated per each field on the control track CT, the rising edge portion of the control signal can be used for phase control of the capstan motor. When one frame is composed of multiple video tracks, however, still only one control signal is generated per each field as above, and since phase control is performed with the control signal, the ability of the control signal to precisely control the capstan motor decreases, even though the rising edge of the control signal is used to produce the frame control signal. For example, when a frame is formed by eight video tracks, the phase control signal is provided only twice for every eight video tracks. Accordingly, it is disadvantageous in that the accuracy of the phase control decreases.

In addition, because the frame control signal conveys information for indicating the reference point of one frame of a television picture, the absence of this information deprives the display circuit of a reference point for interlaced scanning. As a result, the frame is not properly formed. In a VHS (Video Home System) format, the conventional home video tape recorder allows for a video format of one field for each video track on the video tape and one frame, constituting one still television picture, for every two video tracks. However, when a frame is made up of more than two video tracks, it is impossible to discriminate the respective frames with only the control signal in control track of the video tape. Therefore, it is disadvantageous in that the prior method for generating the frame control signal in a VTR is unable to be adapted to a system in which one picture frame is formed by multiple video tracks.

SUMMARY OF THE INVENTION

It is an object of the present invention to provide a method for recording and reproducing a frame control signal for a VTR in which the frame control signal, serving as a reference signal of a video signal, is commonly supplied to a control track of a video tape with multiple video tracks for each frame, when the video signal is recorded on or reproduced from the video tape within the VTR, in order to solve the above described problems.

To achieve the object, when a video signal is recorded on and reproduced from multiple video tracks of a video tape, in order that one frame control signal, serving as a reference signal, is commonly held on a control track of the video tape to make the number of rising edges of the control signal be "n", a method for generating frame control signals in a video tape recorder according to the present invention, in which the phase of a capstan motor is controlled, and the frame control signal thereof is generated by a microprocessor, comprises the steps of:

determining whether the video tape recorder is in a record or a playback mode, when an interrupt signal is fed into the microprocessor;

decreasing the value of "n" which corresponds to the number of rising edges of the control signal within each frame by "1", and thereby counting the number of rising edges of the control signal to determine whether the value "n" equals "0" or not, when the video tape recorder is determined to be in the record mode;

recording the control signal at a 60% duty cycle on the control track of the video tape, controlling the phase of the capstan motor and returning to an interrupt step, when the value "n" does not yet equal "0" in the step of counting the number of rising edges of the control signal;

recording the control signal at an α % duty cycle on the control track of the video tape, resetting the value "n" to its original value, controlling the phase of the capstan motor, and returning to the interrupt step, when the value "n" equals "0" in the step of counting the number of rising edges of the control signal;

determining whether the number "n" of the rising edges of the reproduced control signal equals "0" or not when the present mode of the video tape recorder is a playback mode in the step of determining the mode;

generating a frame control signal and checking if the reproduced control signal is of the α % duty cycle when the number "n" equals "0";

checking if the reproduced control signal is of the α % duty cycle when the number "n" does not equal "0";

resetting the number "n" of the rising edges of the reproduced control signal to its original value, controlling the phase of the capstan motor and returning to the interrupt step when the reproduced control signal is of the α % duty cycle; and decreasing the number "n" of the rising edges of the reproduced control signal by "1", controlling the phase of the capstan motor and returning to the interrupt step when the reproduced control signal is not of the α % duty cycle.

BRIEF DESCRIPTION OF THE DRAWINGS

Other objects and advantages of the present invention will become more apparent from the following description with reference to accompanying drawings, in which:

FIG. 2A is a pictorial representation of a drum with two heads;

FIG. 2B is a format diagram showing the video and control tracks of a conventional video tape corresponding to the drum in FIG. 2A;

FIG. 3A is a pictorial representation of a drum with four heads;

FIG. 3B is a format diagram showing the video and control tracks of a video tape corresponding to the drum in FIG. 3A according to the present invention;

FIGS. 4A to 4D are waveforms showing a control signal before and after the waveform shaping, a phase control signal and a frame control signal respectively according to a preferred embodiment of FIG. 3B;

FIG. 6 is a flow chart showing the sequential steps for performing a method for generating a frame control signal according to the present invention.

DETAILED DESCRIPTION OF THE INVENTION

FIGS. 3A and 3B are representations respectively showing a drum with four heads, a video track and a control track of a video tape according to the present invention.

Referring to FIGS. 3A and 3B, the video tape T is advanced by a capstan motor, and video signal are recorded and reproduced via four video heads HA, HB, HC, and HD mounted on the drum D which is driven by the rotation of an unshown drum motor. As shown in FIG. 3B, the video signals are stored on the video track VT of the video tape in the same sequence as the four video heads and in synchronization with control signals stored on the control track CT. A control signal in the control track CT is composed of two rising edge signals and two falling edge signals per each field, and is recorded onto the control track CT per each field following a predetermined duty cycle pattern. Here, the predetermined duty cycle is calculated as the ratio of the interval between an initial rising edge signal and the next falling edge signal to the interval between the initial rising edge signal and the next rising edge signal. The falling edge signals are positioned between the rising edge signals by a predetermined duty cycle. In a standard VHS system, the preferred duty cycle of the control track CT is 60%, but, in the present invention, the initial video frame is designated as the starting point of the entire television frame, and the duty cycle between the first two rising edge signals of the frame is set at α %, so that one frame is still formed by two fields.

Referring to FIGS. 4A to 4D, the video track VT and the control track CT of the video tape T are shown, wherein one frame is formed by eight video tracks, as in FIG. 3B, and the control signal before and after waveform shaping, the phase control signal, and the video frame control signal are illustrated, respectively.

Upward arrows ↑ on the control track of the video tape illustrated at the upper portion of FIG. 4A indicate that the track is magnetized to the N pole, and a rising edge of the control signal is present. Meanwhile, downward arrows ↓ represent S pole magnetizations and falling edges.

Figures 5A, 5B, 5C:
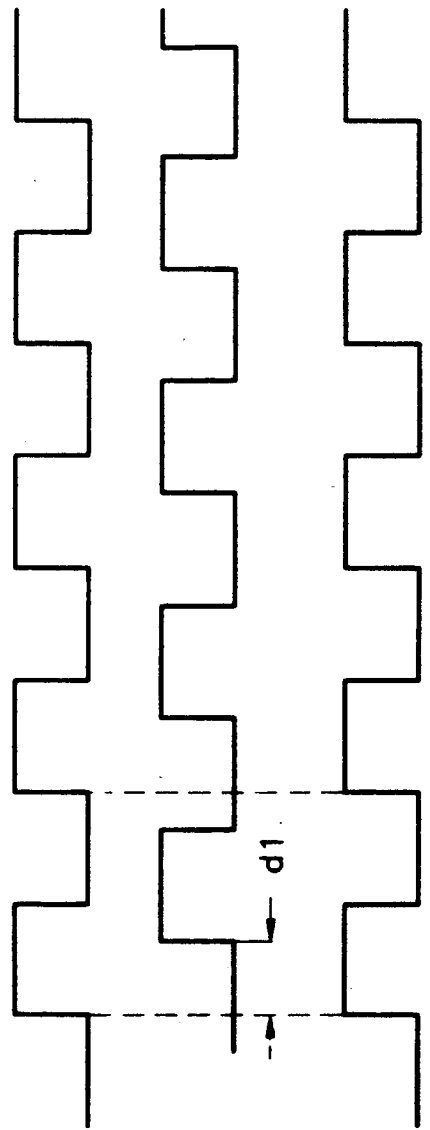
FIGS. 5A to 5C are timing charts for controlling the phase of a drum and a capstan motor in accordance with a synchronizing signal of the present invention.

Referring to FIGS. 5A to 5C, the timing charts of the phase control signals of the drum motor and capstan motor corresponding to the synchronizing signal Sync are shown. Here, the phase signal of the capstan motor in FIG. 5C is in synchronism with the synchronizing signal Sync in FIG. 5A, and the phase signal of the drum motor in FIG. 5B is phase-controlled to be delayed by d1 from the synchronizing signal Sync. The principle of operation is based on a method for altering the duty cycle of the control signal from the control track; in which the control signal has a 60% duty cycle as a reference, i.e., digit "0", according to the VHS standard. Here, by syncing on the vertical synchronizing signal Vsync which is separated from the synchronizing signal Sync and which represents the beginning of a frame, when the frame control signal is commonly held at α % duty cycle as shown in FIG. 4B, the frame control signal is generated and the phase of the capstan motor is controlled in the rising edge portion of the frame control signal.

FIG. 6 is a flow chart showing the sequential steps performing a method for generating a frame control signal according to the present invention.

Referring to FIG. 6, the method for generating the frame control signal comprises the steps of deciding between record and playback modes (S1 and S2), counting the number of rising edges of the control signal (S3 and S4), recording the control signal at a 60% duty cycle (S5, S13 and S14), recording the control signal at a α duty cycle (S6, S7, S13 and S14), generating the frame control signal (S8 to S12) and controlling the phase of the capstan motor (S13 and S14).

In step S1, an external interrupt signal is inputted into the microprocessor 1, triggering step S2, whereby the mode of the video tape recorder is judged to be a record or playback mode. When it is in the record mode, the steps S3 and S4 of counting number of the rising edges of the control signal to which further reference will be made are performed. On the other hand, when it is in the playback mode, the step S8 of counting the number of rising edges of the reproduced control signal is performed.

In step S3, when the video tape recorder is determined to be in the record mode from step S2, the value "n" which is prestored in the CPU and which represents the number of rising edges of the control signal corresponding to one frame is decreased by one. The value "n" varies depending on the format of the video tape forming one frame with multiple video tracks.

Next, in step S4, the microprocessor 1 determines whether "n" equals "0" or not by decreasing the number "n", i.e., the number of rising edges of the control signal per frame, by "1", every time step S3 is performed.

When the value of "n" in step S4 is not "0", the capstan motor is phase-controlled during step S5 to be in sync with the synchronizing signal as illustrated in FIGS. 5A and 5C, and the phase control signal of the drum motor is also phase-controlled to have the time delay d1, as in FIGS. 5A and 5B, between the fixed control head and the video head switching signal of the drum motor. The control signal is recorded at a 60% duty cycle in step 5. The microprocessor 1 outputs a command signal to control the phase of the capstan motor in step 13, and then, in step S14, returns to the interrupt step. The duty cycle indicates the ratio between two time intervals established by the falling edge signal and the next rising edge signal of the control signal on the control track. Here, a 60% duty cycle denotes the duty cycle on the control track based on the standard of VHS format. According to the index standard of VHS, a 60% duty cycle corresponds to digit "0", and 27.5% to "1".

In step S6, when the value "n" in step S4 equals "0", a control signal with a duty cycle of $\alpha$ % is recorded on the control track of the video tape. $\alpha$ % duty cycle refers to the first control signal pulse on the control track in each frame. In step S7, the microprocessor 1 resets the value of "n" to its original value, controls the phase of the capstan motor S13, and then returns to the interrupt in step S14.

In step S13 of controlling the phase of the capstan motor, when, in step S2, the video tape recorder is in the record or playback mode, the capstan motor is phase-controlled to be in sync with the synchronizing signal Sync.

Figure 1:
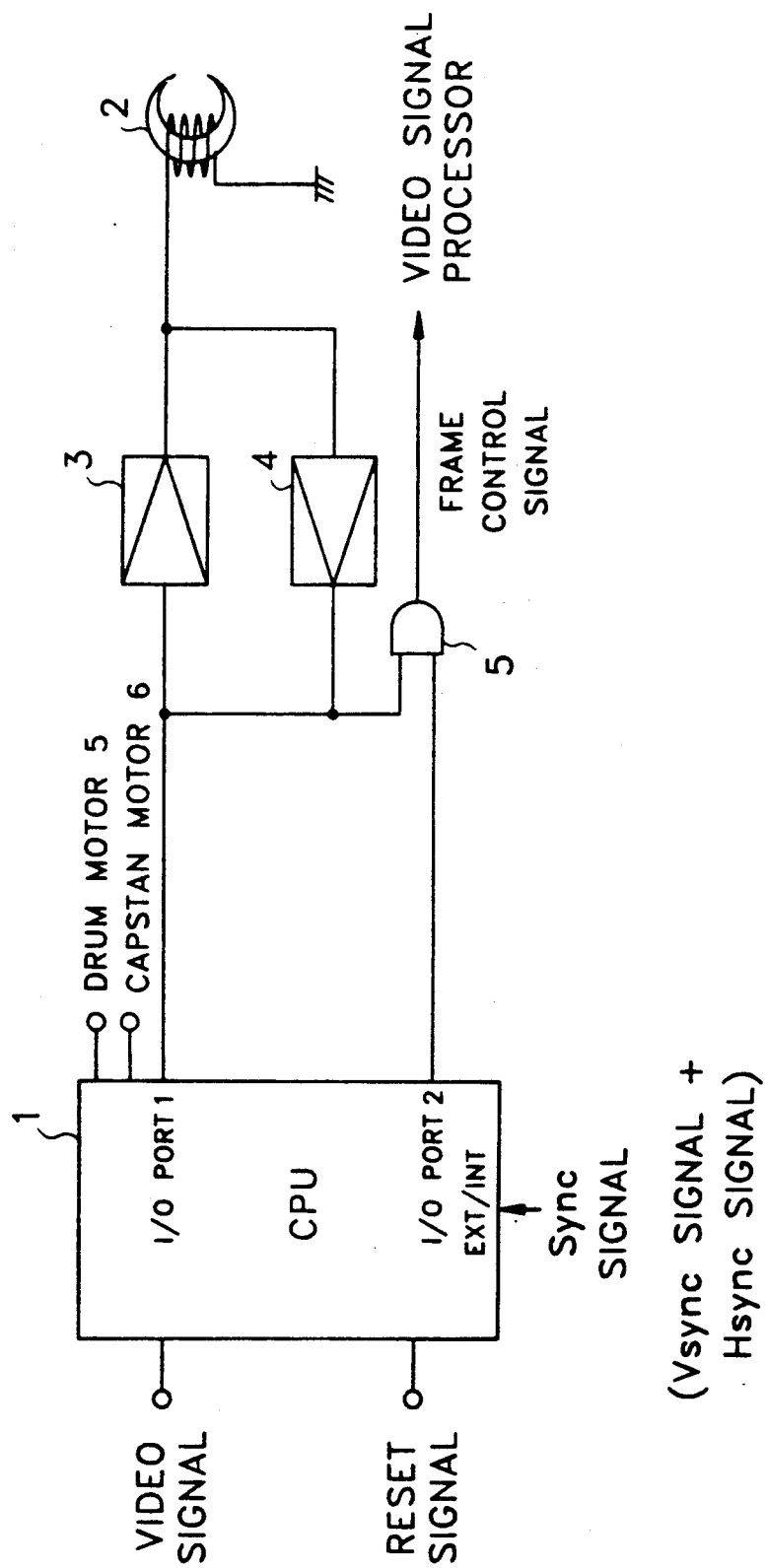
FIG. 1 is a block diagram showing the hardware composition for a device for generating a frame control signal of a VTR according to the present invention.

In step S8, the microprocessor 1 determines whether the number "n" of the rising edges of the control signal reproduced from the control track by the control head 2 equals "0" or not. When the number "n" equals "0", the frame control signal is generated in step 9. That is, as shown in FIG. 1, a high signal is outputted at the second input/output port I/O PORT 2 of the microprocessor 1 in step 9. Otherwise, when the number "n" does not equal "0", the frame control signal is not generated. That is, as shown in FIG. 1, a low signal is outputted at the second input/output port I/O PORT 2. Next, the microprocessor 1 judges whether the reproduced control signal is of the $\alpha$ % duty cycle in step 10. Then, when the reproduced control signal is of the $\alpha$ % duty cycle in step 10, the microprocessor 1 resets the number "n" to its original value in step 11. On the other hand, when the reproduced control signal is not of the $\alpha$ % duty cycle, the microprocessor 1 decreases the number "n" by "1" in step 12. After performing step 11 and step 12, the microprocessor 1 controls the phase of the capstan motor in step 13 and returns to the interrupt step 14.

As described above, when the video signal is recorded on or reproduced from a video tape of a VTR in which a frame control signal serving as a reference signal of the video signal is commonly held on the control track of the video tape with multiple video tracks per one frame, because a method for generating the frame control signal of the VTR is controlled by a microprocessor without any change to the standard of the conventional VTR, the manufacturing cost is not raised and the controlling effect of the capstan motor is enhanced.

What is claimed is:

1. A method for recording control signals in a control track portion of a video tape in which a multiplicity of video signal tracks are recorded in a video track portion for each frame of a video image, said control signals being used in the control of video signal processing and motor phase control of a video tape recorder, said control signals being in the form of pulses each having a specified duty cycle over a specified pulse period, wherein the number of rising edges of said control signal pulses for each frame is equal to an integer n, comprising the steps of:
   setting n to its initial value;
   decreasing the value of n by one in response to an interrupt signal;
   determining whether n is equal to zero;
   recording a control signal pulse at a 60% duty cycle when n is not equal to zero; and
   recording a control signal pulse at a $\alpha$ % duty cycle when n is equal to zero, $\alpha$ being a value other than 60%, and resetting n to its initial value;
   wherein a control signal pulse having a $\alpha$ % duty cycle represents a frame reference signal representing the beginning of a video image frame.

2. A method for recording control signals according to claim 1, wherein n=4, and $\alpha$=27.5%.

3. A method for generating frame control signals in a video tape recorder from control signal pulses recorded on a control track portion of a video tape in which a multiplicity of video signal tracks are recorded in a video track portion for each frame of a video image, said frame control signals being used as frame reference signals in the control of video signal processing by said video tape recorder, each of said control signal pulses having a specified duty cycle over a specified pulse period, wherein the number of rising edges of said control signal pulses for each frame is equal to an integer n, comprising the steps of:
   setting n to its initial value;
   reproducing a control signal from said video tape;
   determining whether n is equal to zero in response to an interrupt signal;
   generating a frame control signal when n is equal to zero;
   determining whether the duty cycle of said reproduced control signal is $\alpha$ %, $\alpha$ being a decimal number;
   decreasing the value of n by one when said duty cycle is not $\alpha$ %; and
   resetting n to its initial value when said duty cycle is $\alpha$ % wherein a control pulse having an $\alpha$ % duty cycle represents a frame reference signal representing the beginning of a video image frame, and control signal pulses other than frame reference signals having duty cycles other than $\alpha$ %.

4. A method for generating frame control signals according to claim 3, wherein each control signal is used to control the phase of a capstan motor of said video tape recorder.

5. A method for generating frame control signals according to claim 3, wherein n=4 and $\alpha$=27.5%.

6. Apparatus for recording and reproducing control signals on a control track portion of a video tape in a video tape recorder (VTR) in which a multiplicity of video signal tracks are recorded in a video track portion for each frame of a video image, said control signals being used in the control of video signal processing and motor phase control, said control signals being in the form of pulses each having a specified duty cycle over a specifield pulse period, wherein the number of rising edges of said control signal pulses for each frame is equal to an integer n, comprising:
   means for determining whether said VTR is in a record or playback mode in response to an interrupt signal;

means for decreasing n by one after said VTR is determined to be in a record mode;

means for determining whether n is equal to zero after n has been decreased by one;

means for recording a control signal on said control track portion at a 60% duty cycle when n is not equal to zero;

means for recording a frame control signal on said control track portion at a α % duty cycle when n is equal to zero, α being a value other than 60%;

means for resetting n to its initial value after an α % duty cycle control signal has been recorded;

means for determining whether n is equal to zero after said VTR is determined to be in a playback mode;

means for reproducing a control signal from said control track portion in said playback mode;

means for generating a frame control signal used as a video frame reference signal in conjunction with a reproduced control signal when n is equal to zero in said playback mode;

means for determining whether said reproduced control signal has a duty cycle of α %;

means for resetting n to its initial value when said reproduced control signal has a duty cycle of α %;

means for decreasing n by one when said reproduced control signal does not have a duty cycle of α %; and means for controlling the phase of a capstan motor of said VTR in response to the recording or reproducing of a control signal on said video tape.

7. Apparatus for recording and reproducing control signals according to claim 6, wherein n=4 and α=27.5%.

* * * * *

UNITED STATES PATENT AND TRADEMARK OFFICE
CERTIFICATE OF CORRECTION

PATENT NO. : 5,189,568
DATED : February 23, 1993
INVENTOR(S) : Myeoung-Bo SIM, et al.

It is certified that error appears in the above-indentified patent and that said Letters Patent is hereby corrected as shown below:

Col. 6, line 63, "specifield" should be --specified--.

Signed and Sealed this

Fifteenth Day of February, 1994

Attest:

BRUCE LEHMAN

Attesting Officer     Commissioner of Patents and Trademarks